UNITED STATES PATENT OFFICE.

DAVID DOUGLAS WILSON AND JOHN A. WILSON, OF SEAFORTH, CANADA.

PROCESS OF CLEANING EGGS.

SPECIFICATION forming part of Letters Patent No. 649,652, dated May 15, 1900.

Application filed July 6, 1899. Serial No. 722,968. (No specimens.)

*To all whom it may concern:*

Be it known that we, DAVID DOUGLAS WILSON and JOHN A. WILSON, subjects of Her Majesty the Queen of Great Britain, residing at Seaforth, in the county of Huron, Province of Ontario, and Dominion of Canada, have invented certain new and useful Improvements in Processes of Treating Eggs, of which the following is a specification.

Our invention relates to an improvement in a process for treating eggs, the object being to restore eggs to their normal appearance after having gone through the pickling or preserving process.

Under the old system of preserving eggs by the use of lime-water the eggs were placed in the preserving fluid and left either uncovered or covered by placing cloths on top of them and then placing a quantity of quick-slaked lime on the top of the cloths, which in both instances caused the eggs to become quickly coated with carbonate of lime or alkali. After removing the eggs from the preserving fluid it has been the practice heretofore to merely wash them with clear water; but in so doing the particles of lime adhering to the shell were not dissolved, thus leaving them with an unnatural appearance and condition. Added to this is the well-known disadvantage that eggs with carbonate of lime left on the shells are thereby rendered air-tight and will not boil without bursting. We propose covering the preserving fluid in the vats or tanks containing the eggs with deodorized oil for the purpose of excluding air and the carbonic-acid gas contained therein from the eggs and preserving fluid, thus preventing to a great extent the formation and deposit of carbonate of lime on the shells resulting from the action of carbonic acid with the lime used in the pickling or preserving solution, thus tending to keep the eggs sweet and in their natural condition. After having been thus treated the eggs are taken out of the preserving solution, the oil having been first carefully removed, so that no particle thereof shall come in contact with the eggs. The eggs are now rinsed in water and then restored to their normal appearance by passing them quickly into and quickly removing them from a solution of hydro-chloric, acetic, or sulphuric acid or equivalent chemical which will dissolve the alkaline deposit on the shell without affecting the shell itself. It may be stated at this point that the strength of the chemical solution is about one part of chemical to eight or ten of water. Upon removing the eggs from the restoring solution they are again thoroughly rinsed with clean water, so as to remove the acid and deposit upon the shell loosened by the action of the acid, and finally the eggs are thoroughly air-dried.

The two features of our process which we would particularly impress are that the eggs are quickly passed into and out of the acid solution, so that the acid is not given time to attack the shell itself, but merely acts upon the alkaline deposit upon the shell, and the other feature consists in the use of a solution of such strength that this quick passage of the eggs into and out of the solution accomplishes the result desired. The result of this treatment is that the shells will be almost, if not quite, restored to their natural bloom and appearance, and danger of the eggs bursting when boiled, hitherto alluded to, is very greatly removed. The danger of the eggs bursting when boiled is not only lessened, but the eggs have such an appearance as to very closely approximate that of fresh-laid eggs.

Having fully described our invention, what we claim as new, and desire to secure by Letters Patent, is—

1. The herein-described process of restoring eggs to their natural appearance after having been through a pickling or preserving process, which consists in subjecting the eggs to the action of a chemical solution of sufficient strength to quickly loosen the deposit thereon without attacking the shell of the egg, and thereafter immediately cleansing the eggs, substantially as and for the purpose described.

2. The herein-described process of restoring eggs to their natural appearance after having been through a pickling or preserving process, which consists in subjecting the eggs to the action of a chemical solution of sufficient strength to quickly loosen the deposit thereon without attacking the shell of the egg, and thereafter immediately cleansing the eggs and finally drying the eggs thoroughly, substantially as and for the purpose described.

3. The herein-described process of restoring eggs to their natural appearance after having been through a pickling or preserving process, which consists in first rinsing the eggs in water, then subjecting the eggs to the action of a chemical solution of sufficient strength to quickly loosen the deposit thereon without attacking the shell of the egg, and thereafter immediately cleansing the eggs, substantially as and for the purpose described.

4. The herein-described process of restoring eggs to their natural appearance after having been through a pickling or preserving process, which consists in first rinsing the eggs in water, then subjecting the eggs to the action of a chemical solution of sufficient strength to quickly loosen the deposit thereon without attacking the shell of the egg, and thereafter immediately cleansing the eggs, and finally drying the eggs thoroughly, substantially as and for the purpose described.

DAVID DOUGLAS WILSON.
JOHN A. WILSON.

In presence of—
R. S. HAYS,
J. A. JACKSON.